UNITED STATES PATENT OFFICE.

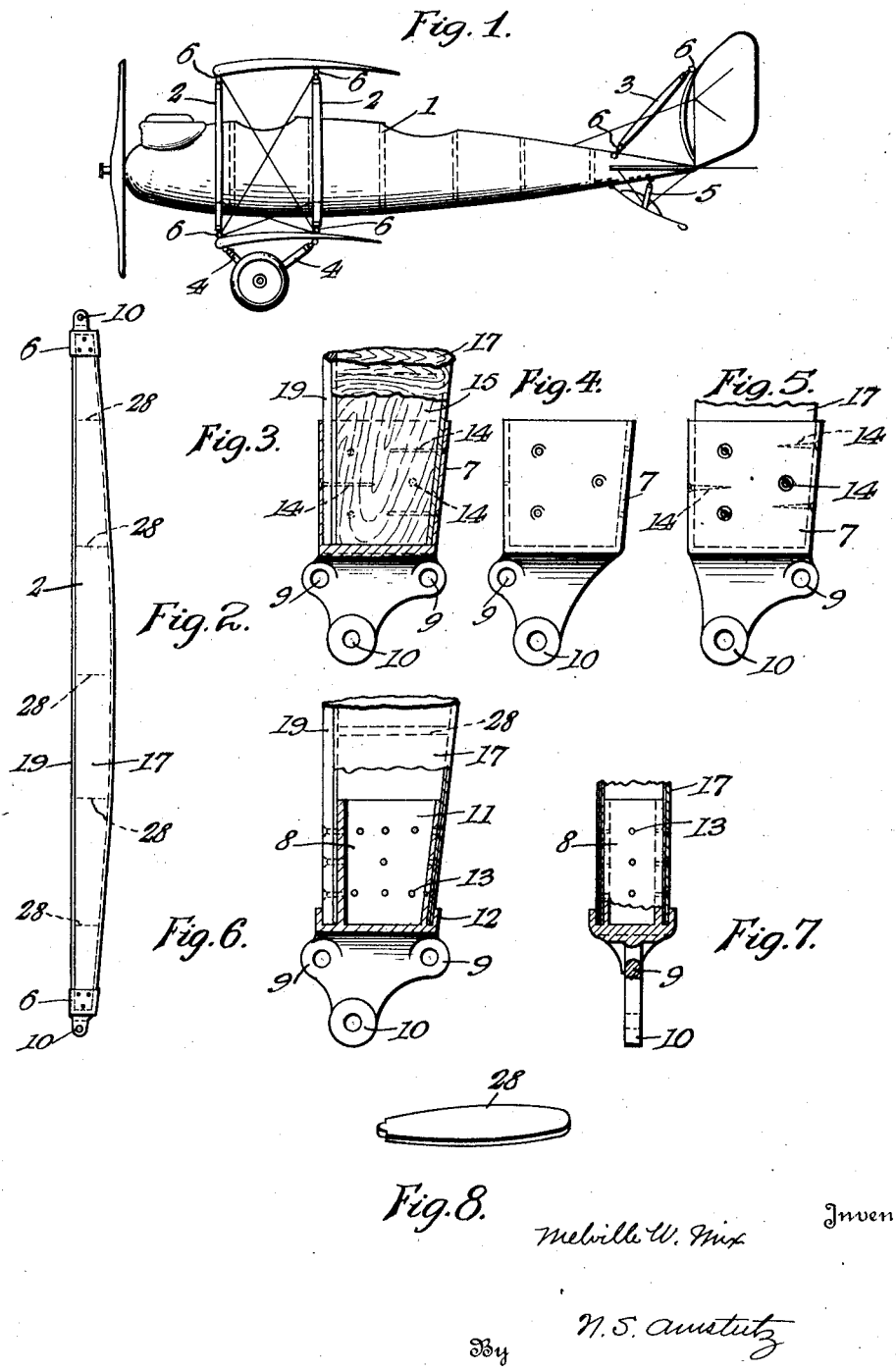

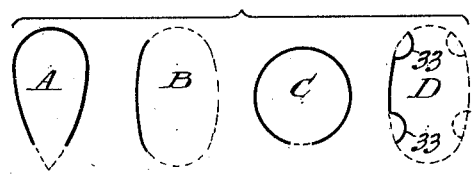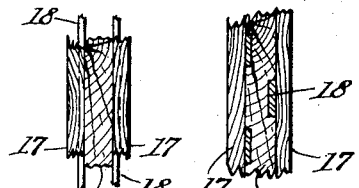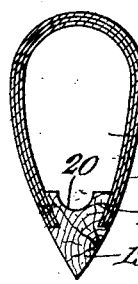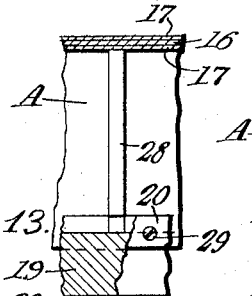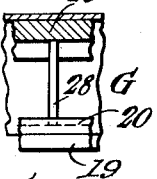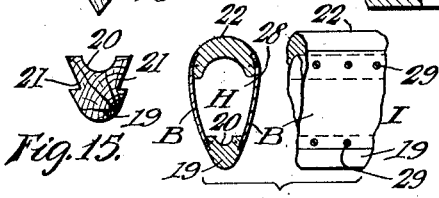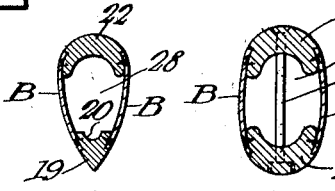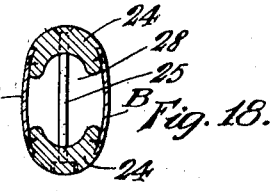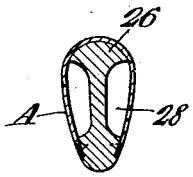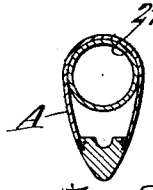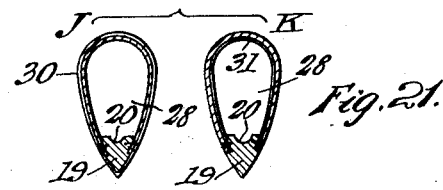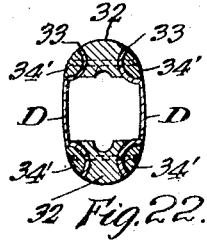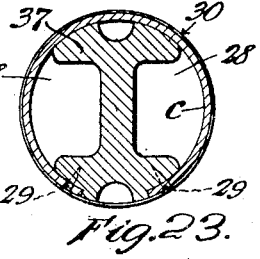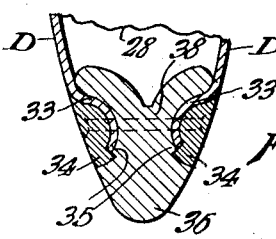

MELVILLE W. MIX, OF MISHAWAKA, INDIANA.

AIRPLANE OR ANALOGOUS STRUT MEMBER.

1,338,836.  Specification of Letters Patent.  Patented May 4, 1920.

Application filed October 16, 1917. Serial No. 196,918.

*To all whom it may concern:*

Be it known that I, MELVILLE W. MIX, a citizen of the United States, residing at Mishawaka, in the county of St. Joseph and State of Indiana, have invented certain new and useful Improvements in Airplane or Analogous Strut Members, of which the following is a specification.

My invention relates to improvements in airplane or analogous strut members and it more especially appertains to the features pointed out in the annexed claims.

The purpose of this invention is to provide a form of strut which will have a large margin of strength with a small weight factor; that shall be adaptable to airplane or any other purposes to which the same may be applied; that utilizes laminated body members and longitudinal reinforcements of various shapes to meet different practical requirements; that has reinforcing end members for attaching the struts wherever needed.

With these and other ends in view I illustrate in the accompanying drawings such instances of adaptation as will disclose the broad underlying principle of the invention without limiting myself to any specific form of alternative expedients.

Figure 1 is a diagrammatic side elevation of an airplane, locating some of the points where struts may be used.

Fig. 2 is a side elevation of a strut with the front edge facing to the right.

Fig. 3 is an enlarged elevation partly in section of a socket form of end reinforcement.

Fig. 4 is a side elevation of a specially adapted end casting for a rear plane strut.

Fig. 5 is a side elevation of a specially adapted end casting for a forward-plane strut.

Fig. 6 is an elevation in section of a modified form of end reinforcement.

Fig. 7 is a front elevation of Fig. 6.

Fig. 8 is a perspective of a detached spreader plate.

Fig. 9 instances A, B, C and D types of veneer members.

Fig. 10 is an enlarged sectional view of reinforcements combined with the outer plies.

Fig. 11 is a similar view of reinforcements embedded in the inner member.

Fig. 12 is an enlarged cross section of a strut member.

Fig. 13 is a side elevation partly in section.

Fig. 14 at E shows an extra interior longitudinal reinforcing member, at F a spreader plate and at G a side elevation of E.

Fig. 15 is a detached section of a forward reinforcement showing under cut rabbeted faces.

Fig. 16 at H shows a two part veneer member strut in cross section, and at I a side elevation of the same.

Fig. 17 is a view similar to Fig. 16 H showing forward member with a pointed edge.

Fig. 18 shows an elliptical shaped strut with two-part veneer member attached to two duplicate longitudinal reinforcements which are held to each other by means of bolts, etc.

Fig. 19 is a cross section of a strut having a full depth interior member.

Fig. 20 is a cross section of a strut with a tubular lengthwise reinforcement.

Fig. 21 shows two cross sections of struts similar to Fig. 12 at J with an external metallic sheath and at K with an internal metallic lining.

Fig. 22 is a cross section of a four member strut showing the parts held together by means of bolts or rivets.

Fig. 23 is a cross section of a circular type of strut with a one piece lengthwise internal reinforcement.

Fig. 24 is an enlarged modified detail in section of the fastening means exemplified in Fig. 22.

In practically carrying out my invention I may utilize any well known veneer or laminated material because of its strength and light weight. It is immaterial in its broadest aspect whether the veneer be composed of two, three or more plies; of reinforcements between the plies; or whether the members constituting a complete strut be made specifically according to any one of the forms instanced; or the lengthwise shape and proportions be retained because these are all modifiable to meet the varying needs of practical exigencies as they arise.

While wood veneers are referred to in the ordinary usage of the word "veneer" this is not in itself a limiting factor as composite members of whatever type of lamination are comprised in this invention. The term "strut" is not used in a limiting sense as the forms shown or their equivalents may be used for radically different purposes without departing from the spirit of the invention.

In the instances of adaptation illustrated in the drawings an airplane of conventional type is shown to exemplify some of its possible applications. In this a fuselage 1 forms the body portion to which the planes are attached by means of struts 2, rudder braces 3, running gear supports 4 and tail skid braces 5 and any other parts found adaptable can be formed of my composite members regardless of their specific external contour in cross section or length.

The members 2, 3, 4, 5 etc., have suitable fastening ends 6, 7 or 8 attached thereto. These may be made in any desired manner; several forms are exemplified. In Fig. 6 the trussing tension wires are secured without having special ears provided therefor.

In Figs. 3 and 6 a type of end casting is shown which may serve both forward and rear-plane struts. The one shown in Fig. 4 serves rear struts and the one in Fig. 5 serves forward struts, however these features may be varied almost indefinitely, in some cases the ears 9 or equivalent holes might be omitted entirely.

Each of the ends 6, 7 or 8 is provided with ears 10 by means of which the composite members may be attached to coöperating parts as needed. They may have a deep socket 7 that encircles the body portion of the struts or an internal hollow extension 11 joined onto a narrow flange 12 so as to form a shallow channel into which the end of the body portion is seated. When the socket type is used an internal plug is inserted as shown in Fig. 3. Wood screws 14 serve to hold these parts together and machine screws 13 serve the same purpose for end casting 8. It is not material whether the hollow extension 11 be made with tapering or straight sides. If the struts are of the same cross section throughout their length, with sides parallel to each other, obviously the extensions 11 would conform thereto should they however be more or less tapering toward the ends then the veneer sides may be put into place before the longitudinal reinforcements, such as 19, 24, 32, 35 etc., are fastened near the ends of the struts thus leaving the ends of the laminated struts 17 more or less "open" to readily pass over the flaring end 11 of the socket shown in Fig. 6. When so placed the laminated parts may be fastened to the reinforcements and the whole secured to the sockets by screws 13.

The veneer may comprise an inner ply and outer plies 17 or any other combination. If desired reinforcements 18 may be embedded in any of the plies so as to run parallel with the grain of the ply. These veneers may be formed in many shapes, as shown at A—D inclusive of Fig. 9, or the curved section B may be substituted by a straight section to meet other structural requirements. These several forms are combined with longitudinal reinforcements such as 19, 22, 23, 24, 26, 27, 32, 36, 37, etc. Spreader plates 28 formed of various outlines to fit the specific type of member with which they are to be used serve as transverse reinforcements.

Bars 19 are reduced in weight by a groove 20 Fig. 15. Other bars as Figs. 22 and 23 are similarly treated. The bars 19 have rabbeted faces 21 against which the edges of the veneer body abut. Bars 22, 24, 26 and 37 as also rabbeted for the same purpose.

The veneer body may be glued to the ribs and held by screws 29 or if found as D in Fig. 9, the curving edges 33 lie in corresponding grooves formed in bars 32 or 36. In this case follower bars 34' and 34 and bolts, screws, or rivets 38 hold the parts together. In Fig. 24 the follower bars 34 have veneer abutting faces 35 while in Fig. 22 the veneer edges come to the outer surface.

Bars 22 form a part of the outer surface of a strut and bars 23 are placed inside of the veneer, being secured in any suitable manner. Duplicate bars 24, similar to bars 22 form an elliptical cross section, in which case undercut rabbets help to hold the veneer edges as the bolts 25 are tightened. The one-piece bars 26 and 37 lie entirely within the veneer body except a small arc which joins the open side of the body. Instead of bars 23 and 26 tubes 27 may be utilized.

Should a metallic protection be desired an external sheath 30, Figs. 17 J and 23, or an internal lining 31, Fig. 17 K may be used.

It will be seen that a unique structural member has been produced, one which lends itself to peculiarly arduous practical requirements in an effective and simple manner. As this invention is of commanding importance protection thereon is claimed in its broadest possible scope.

What I claim is:

1. A composite article of manufacture, comprising a laminated stream-line body portion constituting a unit, separate longitudinal reinforcements independently secured to the body, internally secured end members therefor, and a metallic sheath or lining of stream-line shape adapted to coöperate with the other parts in forming a complete structural unit.

2. A composite article of manufacture, comprising a laminated streamline body constituting a unit, independent longitudinal reinforcements to which the body is attached, internally secured end members having a projecting flange to protect the extreme end edges of the laminated body unit, and an additional thin metallic coöperating reinforcement adapted to supplement the other reinforcements to form a complete structural unit.

3. In structural units a body having laminated sides, grooved means for securing adjacent edges of the sides, and separate strips for holding the edges of the sides in the grooves.

4. In structural units, a bent up laminated body unit, a longitudinal reinforcement to which adjacent edges of the body unit are secured, grooves in such reinforcement, curved edges of the body adapted to rest in such grooves, and external means for holding the parts assembled.

5. In structural units, a single composite shell constituting a unit, a longitudinal reinforcement to which the edges of the shell are attached, other longitudinal reinforcing means independently secured to the inside of the unit each of the reinforcements adapted to separately resist strains placed on the shell at different points and to also coöperate with each other and the shell in withstanding over-all or special stresses to which the same may be subjected.

In testimony whereof I affix my signature in the presence of two witnesses.

MELVILLE W. MIX.

Witnesses:
SAGE W. SCHUYLER,
GEO. B. KENYON.